United States Patent Office 3,089,601
Patented May 14, 1963

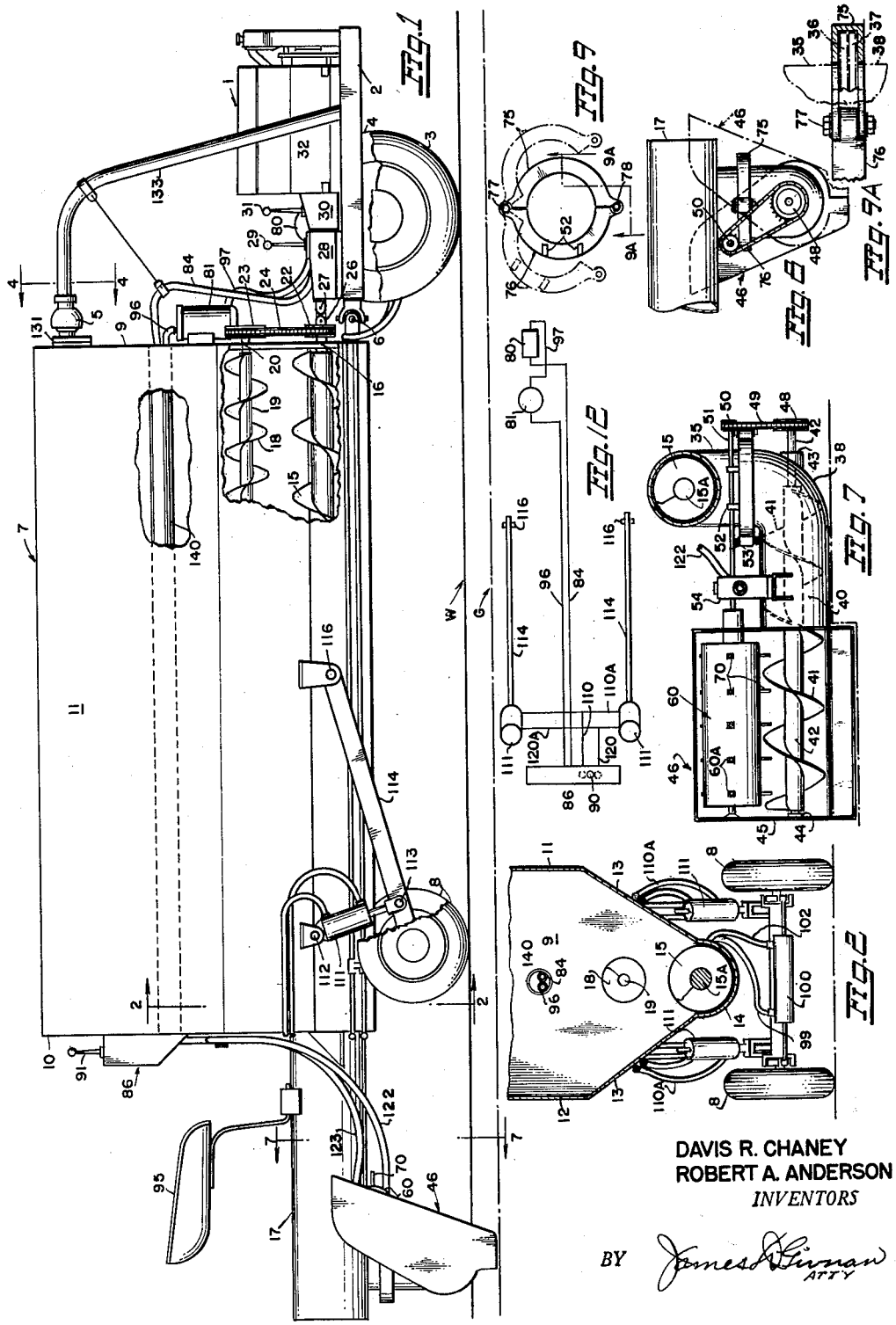
DAVIS R. CHANEY
ROBERT A. ANDERSON
INVENTORS

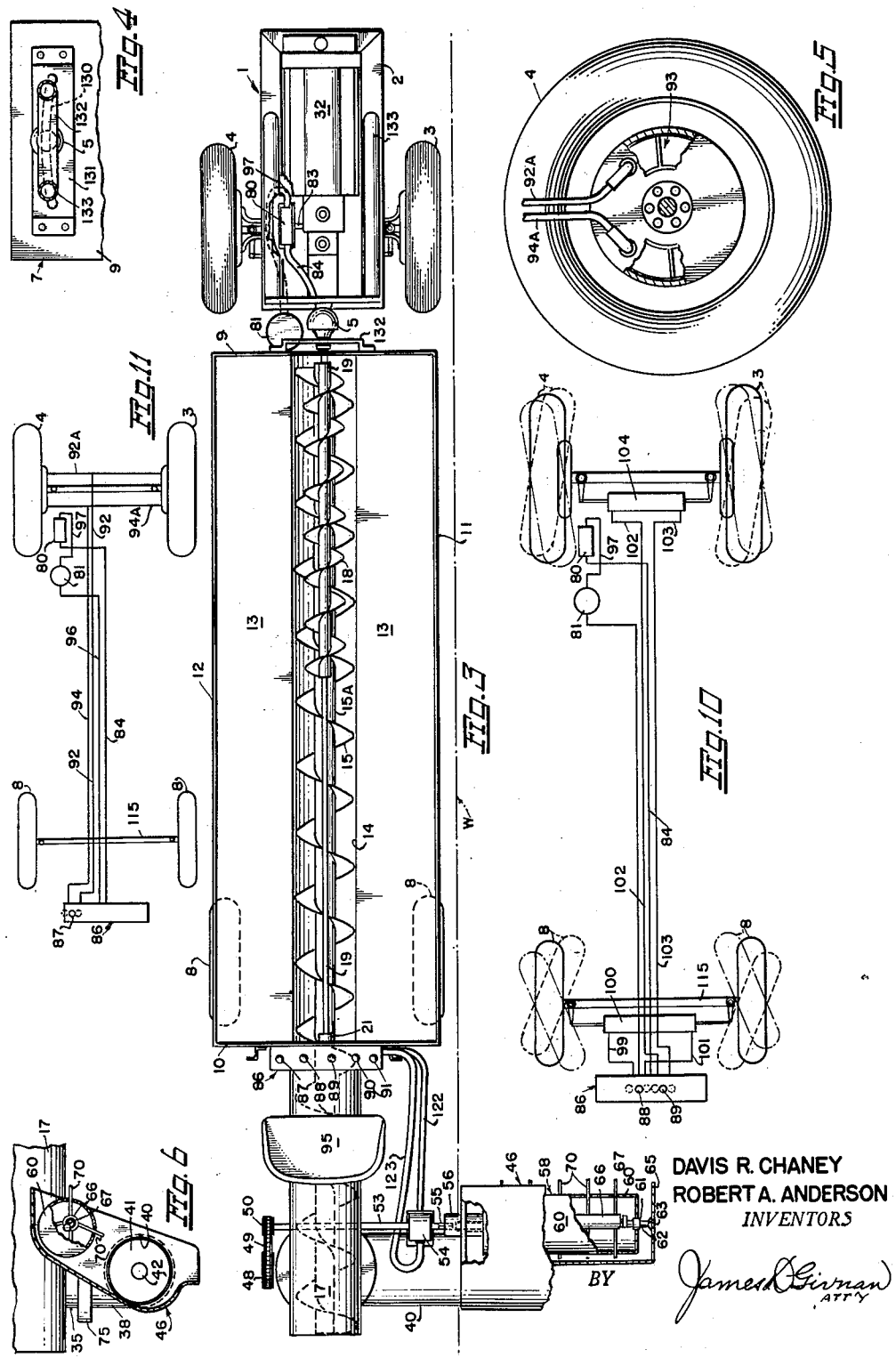

3,089,601
MOBILE HOPPER AND SCREW CONVEYOR PICKUP, LOADING AND UNLOADING MEANS THEREFOR
Davis R. Chaney, Rte. 2, Box 246B, and Robert A. Anderson, Rte. 2, Box 212, both of Woodburn, Oreg.
Filed May 24, 1960, Ser. No. 31,365
5 Claims. (Cl. 214—522)

This invention relates generally to mobile loading and unloading apparatus and more particularly, though not restrictively so, to a vehicle adapted for use in cleaning the ground beneath and along community cages as installed in modern hen houses.

It is one of the principal objects of the invention to provide self-propelled conveniently maneuverable apparatus of the character described which includes pickup conveyor means selectively operable from either side of the vehicle at right angles to and in communication with a loading conveyor extending into a hopper carried by the vehicle and load-levelling conveyor means cooperating with the loading conveyor.

A further object of the invention is to provide apparatus of the character described which is of large capacity, rapid and efficient in cleaning and loading operations and wherein the traction wheels of the vehicle, the steering thereof, the pickup conveyor means and its adjustment are all fluid-pressure actuated in a positive and efficient manner and controlled by one operator.

A still further object of the invention is to provide apparatus as herein described which has ample power and maneuverability for all conditions and circumstances and one which is of strong durable construction to withstand the usage to which such apparatus is subjected and which will have a high degree of utility, not only for the purpose stated, but also in other loading, transporting and discharging operations.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of apparatus made in accordance with our invention and with fragments broken away for convenience of illustration.

FIGURE 2 is a sectional end elevational view taken approximately along the line 2—2 of FIGURE 1.

FIGURE 3 is a top plan view of FIGURE 1 with fragments broken away.

FIGURE 4 is a fragmentary detail view taken approximately along the line 4—4 of FIGURE 1.

FIGURE 5 is a side elevational view on an enlarged scale of a typical traction wheel.

FIGURE 6 is a fragmentary detail end view of a pickup screw conveyor and means associated therewith for disintegrating and agitating the material being dealt with while urging the material toward a loading screw conveyor.

FIGURE 7 is an elevational sectional detail view taken approximately along the line 7—7 of FIGURE 1.

FIGURE 8 is an elevational view of the right-hand end of FIGURE 7.

FIGURE 9 is a detail plan view of an annular coupling for the cylindrical housings for the intake and loading screw conveyors.

FIGURE 9A is a sectional detail view on an enlarged scale taken approximately along the line 9A—9A of FIGURE 9 and showing in broken lines the flanges of the screw conveyor housing held in operative engagement by the coupling.

FIGURE 10 is a diagrammatic view of the fluid pressure control means for steering the apparatus.

FIGURE 11 is a similar view of the fluid pressure control system for selectively imparting forward or rearward rotation to the traction wheels of the apparatus.

FIGURE 12 is a similar view showing the fluid pressure system for raising and lowering the hopper and pickup screw conveyor relative to the ground or material being dealt with.

With continuing reference to the drawings wherein like reference characters designate like parts, reference numeral 1 indicates generally a tractor or traction unit comprising a chassis 2 mounted upon traction wheels 3 and 4 and coupled by two universal joints 5 and 6 to a trailer unit, indicated generally at 7. The trailer is adjustably supported upon ground-engaging idling wheels 8 and comprises a substantially V-shaped hopper having vertical front and rear end walls 9 and 10, vertical side walls 11 and 12 converging downwardly, as at 13, into a rounded bottom wall 14 to accommodate a rotatable loading screw conveyor, indicated generally at 15. The shaft 15A of this screw conveyor is journalled at its forward end, as at 16, in the front wall 9, and the opposite end of the screw conveyor is rotatably supported in a loading tube 17 secured at its forward end to the rear wall 10 of the hopper and open at its rearward end.

Disposed above and parallel with the loading screw conveyor 15 is a feed-back screw conveyor 18 whose shaft 19 is journalled at its forward end, as at 20, in the front wall 9 of the hopper and at its opposite end in a bearing 21 secured to the rear wall 10 of the hopper. The foremost ends of the screw conveyor shafts 15A and 19 are provided, respectively, with sprocket wheels 22—23 with a sprocket chain 24 entrained therearound. The shaft of the loading screw conveyor 15 is universally coupled, as at 26, to the shaft 27 of a power transmission means 28 operable by a shifting lever 29 and coupled to a clutch mechanism 30 operable by a lever 31 and connected in a conventional manner to the power output shaft of an internal combustion engine 32 mounted upon the chassis 2 of the traction unit 1.

In open communication at its top end with the interior of the loading screw conveyor tube 17 is a duct 35 whose bottom end is provided with an annular flange 36 matching a similar flange 37 provided at the upwardly turned inner end 38 of a tubular housing 40 for a pickup screw conveyor 41. One end of the pickup screw conveyor shaft 42 is journalled in a bearing 43 carried by the inner end of the screw conveyor housing 40, and its opposite end is journalled in a bearing 44 carried by the outer wall 45 of a shroud or scoop, indicated generally at 46. The inner end of the screw conveyor shaft 42 is provided with a sprocket wheel 48 driven by a sprocket chain 49 entrained over a driving sprocket 50 secured to one end of a shaft 51 journalled in bearings 52 and connected to, or which may be an integral part of, the power output shaft 53 of a fluid pressure motor 54. The opposite end of this motor shaft is connected by its squared end as at 55 into one end of the shaft 56 of rotary means, indicated generally at 58, for disintegrating and agitating the material being picked up by the scoop and at the same time urging the material into the pickup screw conveyor. This agitating and disintegrating means, as best illustrated in FIGURES 3, 6 and 7, comprises a hollow drum 60 secured at one of its ends to the shaft 56 and provided with spaced apart openings 60A in its peripheral wall. The opposite end of the drum 60 is rotatable, as at 61, about one end of a stationary crank shaft 62 whose one end is welded, as at 63, to the outer wall 65 of the shroud 46. The opposite end of the crank shaft extends into the hollow shaft 56, but in no way interferes with the rotation of the drum 60. A sleeve 66 (see also FIGURE 6) is freely rotatable about the crank 67 of the crank shaft, and to this sleeve the inner ends of fingers 70 are loosely attached. The fingers, as shown, are rotatable by the drum 60 in an orbit eccentric to the drum so that, as also shown in FIGURE 3, with the drum and fingers in clockwise rotation, the fingers will agitate and disintegrate the material being dealt with while sweeping it toward the pickup screw conveyor 41, also rotating in a clockwise direction.

The flange 37 at the upwardly turned open end 38 of the pickup screw conveyor housing 41 is rotatably attached to the matching flange 36 of the duct 35 by means of a coupling in the form of an annulus comprising two sections 75—76 hingedly interconnected at one side by a bolt 77 and interlocked by a bolt 78 at the other. The section 76 carries the bearings 52 above referred to and the shaft 51 journalled through the bearings prevents rotation of the coupling during swinging movement of the screw conveyor pickup assembly from one side of the apparatus to the other.

From the foregoing it will be readily apparent that the pickup screw conveyor and agitating and disintegrating means will function as just described with the scoop opening forwardly with the apparatus traveling in a forward direction, as viewed in FIGURES 1 and 3, or in a reverse direction with the pickup screw conveyor and its related parts swung through 180 degrees and with the shroud opening in a rearward direction, as shown in broken lines in FIGURE 8, as the apparatus travels in the same direction.

The pickup loading and unloading operation of the screw conveyors herein shown and described is as follows:

Community cages in modern hen houses are arranged parallel to each other lengthwise of the hen house and separated by a cement walk, indicated at W in FIGURE 1, above the level of the ground, indicated at G. The wire mesh flooring of the cages is elevated from the ground approximately four feet. The outer edge of the flooring is suspended from roof rafters, and their inner edge is supported upon center posts, thus leaving the underlying ground area between the curbing of the sidewalk and the center posts unobstructed throughout the length of the cages. Accordingly, in operating the apparatus of the present invention, it is merely necessary to steer the traction and trailing units along the walk in a line paralleling the curb, so that the inside wall of the scoop 46 will maintain the approximate relationship to the curb, as shown in FIGURES 1, 3 and 7. Rotation of the pickup screw conveyor 41 in a counter-clockwise direction by the fluid pressure motor 54 will move the material scooped from the ground into, through, up and out of the housing 40 and through the duct 35 into the loading tube 17 where the loading screw conveyor 15 driven in clockwise direction by shaft 27 will pull the material forwardly into the hopper 7. The feedback screw conveyor 18 also being driven in a clockwise direction, but with its flights reversed from those of the screw conveyor 15, will effect an even leveling distribution of the material as it builds up within the hopper. The loading and feed-back screw conveyors are driven at a speed of rotation selected by the setting of the transmission control lever 29.

When the cleaning operation has been completed along one side of the walk, the pickup screw conveyor and its related parts may be conveniently swung through 180 degrees to a starting position for a return cleaning operation on the opposite side of the walk by elevating the rearward end of the trailer 7 sufficiently to provide clearance for the scoop.

Three hydraulic pressure systems, supplied by a single pump 80 and surge tank 81, are provided for driving the traction wheels 3 forwardly or rearwardly, steering the traction unit 1 and the trailer 7, and for raising or lowering the rearward end of the trailer, as aforesaid. The pump 80 is mounted upon the chassis 2 in any suitable manner and driven by a power take off shaft 83 of the engine 32. The outlet side of the pump is connected by a conduit 84 with the inlet side of a manifold (not shown) disposed within a housing 86 secured to the rear wall of the trailer 10. The manifold is connected with five valves (not shown) disposed within the housing and each provided with a control lever, as indicated at 87, 88, 89, 90 and 91.

As best illustrated diagrammatically in FIGURE 11, one side of the valve lever 87, which controls the forward or rearward driving of the traction wheels 3, is connected by conduits 92—92A with one side of the wheel turbine 93 (see FIGURE 5), and the other side of the valve is connected by conduits 94—94A with the other side of the turbine. Thus it will be seen that movement of the valve lever 87 to the right, by an operator reposing on the seat 95 mounted upon the tube 17, will impart clockwise rotation to the traction wheels for forward travel of the apparatus, and movement to the left will impart reverse rotation to the traction wheels. Pressure returning to the manifold from either of the conduits 92 or 94 is directed by conduit 96 to one side of the surge tank 81 whose opposite side is connected by conduit 97 to the intake side of the pump 80.

In the system for steering the traction wheels 3 and trailer wheels 8 simultaneously or individually, and as shown in FIGURE 10, one side of the valve controlled by lever 88 is connected by conduit 99 to one side of a power cylinder 100 and its opposite side by conduit 101 to the opposite side of the power cylinder. One side of the valve controlled by lever 89 is connected by conduit 102 to the corresponding side of a forward power cylinder 104, and the other side of this valve is connected by conduit 103 to the opposite side of cylinder 104. To steer the traction and trailer wheels to the right as viewed from the rear thereof, or into the dotted line position shown, the levers 88 and 89 are moved to the right and for steering to the left both levers are moved correspondingly to turn the wheels as shown in broken lines. This novel arrangement which enables simultaneous or selective steering of the traction wheels and trailer wheels renders the vehicle in its entirety readily and accurately maneuverable for the purposes intended.

The raising or lowering of the rearward end of the trailer unit, as above referred to, and as shown in FIGURE 12, is accomplished by manipulation of the valve lever 90, which when moved to the left by an operator will cause fluid pressure to flow through conduits 110—110A to the bottom end of power cylinders 111 hingedly attached as at 112 at their top end to the side walls 11 of the hopper and at their bottom end as at 113 to tie bars 114 near the rear end thereof. The rearmost ends of these bars are hingedly attached in any suitable manner to the axle 115 upon which the wheels 8 are rotatably and steerably mounted, and the forward ends of the bars are hingedly attached as at 116 to the side walls of the trailer. Thus pressure entering the bottom end of the cylinders 111 will elevate the rearward end of the trailer, and movement of the lever 90 to the right will allow escapement of pressure from the top of the cylinders through conduits 120—120A into the valve manifold and thence, as in the other systems just described through conduit 96 back to the surge tank 81.

Rotation of the pickup screw conveyor and drum 60 is controlled by lever 91 which when moved to the right (FIGURE 1) will direct pressure through conduit 122 to the intake side of the motor 54 whose outlet side is connected by conduit 123 to the valve manifold within the valve housing 86. We do not wish to be limited to the particular valves herein described which are exemplary of others which could be used with equal effectiveness.

From the foregoing it will be apparent that we have provided apparatus which is automatically self-loading, conveniently and accurately maneuverable while traveling forwardly or rearwardly in loading operations and in conveying the load to locations of discharge remote from the work being dealt with, whereat the load may be quickly discharged out through the open end of the tube 17 by reversal of rotation of the screw conveyor 15.

The traction unit 1 and trailer unit 7 (see FIGURES 1 and 4) accommodate themselves individually to road and ground irregularities through the medium of the universal couplings 5 and 6, both of which permit of independent pitching or forward and rearward rocking motion of one unit relative to the other. The forward end of the coupling 5 is secured to a plate 132 which interconnects the top ends of a pair of struts 133 whose bottom ends are secured by welding, or the like, to the chassis 2 of the traction unit 1. The rearward end of the coupling 5 is slidably mounted within an arcuate slot in a plate 131 secured to the front wall 9 of the hopper in spaced relation thereto and thereby cooperates with the coupling 6 in permitting of rocking motion from side to side, as aforesaid.

For protecting the conduits 84 and 96 and in the interest of neatness and compactness, we extend these conduits through an open-ended tubular housing 140 disposed within the hopper and extending through the front and rear walls thereof.

While we have shown a particular form of embodiment of our invention, we are aware that many minor changes therein will readily suggest themselves to others skilled in the art without departing from the spirit and scope of the invention. Having thus described our invention what we claim as new and desire to protect by Letters Patent is:

1. Apparatus of the class described comprising in combination a vehicle comprising a traction unit driven by a prime mover mounted thereon and supported upon steerable ground-engaging wheels, a trailer unit including a hopper attached to said traction unit and supported upon steerable ground-engaging idling wheels, a loading screw conveyor rotatably mounted within said hopper and within a tube open at its rearward end and extending outwardly from the corresponding end of said hopper, means operatively interconnecting said loading screw conveyor with said prime mover, a pickup screw conveyor rotatably mounted within a scoop and within a communicating tubular housing in open communication with said loading screw conveyor tube, motor means operatively connected to said pickup screw conveyor, rotatable material-agitating and disintegrating means associated with said pickup screw conveyor and operatively connected to said motor means, a feedback screw conveyor disposed within said hopper in spaced relation to said loading screw conveyor operatively connected to said prime mover and rotatable in a direction to spread incoming material rearwardly within the hopper.

2. Apparatus of the class described comprising in combination a vehicle driven by a prime mover mounted thereon, said vehicle supported upon steerable ground-engaging wheels and including a loading hopper, a loading screw conveyor rotatably mounted within the hopper and driven by said prime mover and extending outwardly from one end of the hopper, a pickup screw conveyor carried by the vehicle and rotatable through 180 degrees relative to said loading screw conveyor and in communication therewith, whereby material can be alternately collected from one side or the other of a line of travel of the vehicle in either of two directions and transferred to said loading screw conveyor for conveyance to the interior of said hopper.

3. Apparatus as claimed in claim 2 including rotatable material-agitating and disintegrating means associated with said pickup screw conveyor and operatively connected to said prime mover.

4. Apparatus as claimed in claim 2 including a feedback screw conveyor disposed within said hopper in spaced relation to said loading screw conveyor operatively connected to said prime mover and rotatable in a direction to spread incoming material rearwardly within the hopper.

5. Apparatus of the class described comprising in combination a vehicle driven by a prime mover mounted thereon, said vehicle supported upon steerable ground-engaging wheels and including a loading hopper having front, rear, and side walls, and a bottom wall of semi-circular formation in cross section, a loading screw conveyor tube in communication through said rear wall of the hopper with said bottom wall and closed at its rearward end, a loading screw conveyor rotatably mounted within said bottom wall within the hopper and within said screw conveyor tube and operatively connected to said prime mover, a pickup screw conveyor housing in open communication at one of its ends with said loading screw conveyor tube and rotatable in a horizontal plane relative thereto, a scoop carried by the opposite end of said pickup housing and in open communication therewith, a pickup screw conveyor rotatably mounted within said housing and said scoop, and rotatable material-agitating and disintegrating means within said scoop adjacent said pickup screw conveyor and operatively connected to said prime mover.

References Cited in the file of this patent

UNITED STATES PATENTS

| | | |
|---|---|---|
| 1,358,594 | Springer | Nov. 9, 1920 |
| 2,355,604 | Rupp | Aug. 15, 1944 |
| 2,765,936 | Phillips | Oct. 9, 1956 |
| 2,916,099 | Bergmann et al. | Dec. 8, 1959 |
| 2,964,119 | Gray et al. | Dec. 13, 1960 |
| 2,968,879 | Rusich | Jan. 24, 1961 |
| 3,017,008 | Olsen | Jan. 16, 1962 |